US009983042B2

(12) United States Patent
Huang et al.

(10) Patent No.: US 9,983,042 B2
(45) Date of Patent: *May 29, 2018

(54) APPARATUS FOR DETECTING LIQUID LEVEL

(71) Applicant: Industrial Technology Research Institute, Hsinchu (TW)

(72) Inventors: Li-Ren Huang, Hsinchu County (TW);
Zen-Dar Hsu, Hsinchu County (TW);
Cheng-Hsun Lin, Hsinchu County (TW); Huan-Ke Chiu, Hsinchu County (TW); Cihun-Siyong Gong, Taipei (TW); Po-Hsun Tu, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 163 days.

This patent is subject to a terminal disclaimer.

(21) Appl. No.: 14/985,183

(22) Filed: Dec. 30, 2015

(65) Prior Publication Data
US 2017/0153139 A1 Jun. 1, 2017

(30) Foreign Application Priority Data

Dec. 1, 2015 (TW) .............................. 104140070 A
Dec. 24, 2015 (TW) .............................. 104143518 A

(51) Int. Cl.
*G01F 23/26* (2006.01)
(52) U.S. Cl.
CPC .......... *G01F 23/266* (2013.01); *G01F 23/268* (2013.01)
(58) Field of Classification Search
CPC ..................................................... G01F 23/26
See application file for complete search history.

(56) References Cited

U.S. PATENT DOCUMENTS 3,995,212 A * 11/1976 Ross ..................... G01F 23/284
324/642
4,610,164 A 9/1986 Sobue et al.
(Continued)

FOREIGN PATENT DOCUMENTS

CN 101840863 A 9/2010
CN 201917376 U 8/2011
(Continued)

OTHER PUBLICATIONS

Taiwan Patent Office, Office Action, Patent Application Serial No. 104143518, dated Apr. 1, 2016, Taiwan.
(Continued)

*Primary Examiner* — Eric S McCall
*Assistant Examiner* — Mohammed E Keramet-Amircolai

(57) ABSTRACT

An embodiment of the invention provides a liquid-level sensor to detect liquid-level information of a liquid to be tested in a container. The sensor includes an electrode, a sensing circuit, an amplifier and a controller. The electrode is disposed on the outer surface of the container, comprising a first electrode and a second electrode. The sensing circuit is coupled to a first electrode and a second electrode, and receives a clock signal to generate a first voltage signal and a second voltage signal. The amplifier receives the first voltage signal and the second voltage signal to output an output voltage. The controller acquires liquid-level information of the liquid to be tested according to the output voltage and a voltage-volume table.

13 Claims, 4 Drawing Sheets

(56) References Cited

U.S. PATENT DOCUMENTS

| | | | |
|---|---|---|---|
| 5,135,485 A | 8/1992 | Cohen et al. | |
| 5,477,727 A | 12/1995 | Koga | |
| 6,016,697 A | 1/2000 | McCulloch et al. | |
| 6,614,241 B2 | 9/2003 | Schmitt et al. | |
| 6,934,634 B1 | 8/2005 | Ge | |
| 7,064,560 B2 | 6/2006 | Yamamoto et al. | |
| 7,982,201 B2 | 7/2011 | Bryant et al. | |
| 8,161,814 B2 | 4/2012 | Calcote | |
| 9,182,265 B1* | 11/2015 | Ward | G01F 23/26 |
| 2002/0008526 A1* | 1/2002 | Martin | G01F 23/26 324/678 |
| 2008/0202745 A1* | 8/2008 | Levy | E21B 47/042 166/250.03 |
| 2008/0231290 A1* | 9/2008 | Zhitomirsky | G01F 23/261 324/661 |
| 2012/0268139 A1* | 10/2012 | Fend | G01F 23/24 324/601 |
| 2012/0323503 A1* | 12/2012 | Welle | G01F 23/26 702/55 |
| 2013/0248525 A1* | 9/2013 | Kataoka | B60K 15/03 220/4.14 |
| 2014/0062461 A1* | 3/2014 | Yuan | G01F 23/38 324/204 |
| 2014/0159743 A1* | 6/2014 | Dayal | G01F 23/284 324/649 |
| 2014/0331763 A1* | 11/2014 | Robb | G01F 23/266 73/304 C |
| 2015/0040659 A1* | 2/2015 | Yu | G01F 23/263 73/290 R |
| 2016/0041021 A1* | 2/2016 | Saitou | G01F 23/26 73/304 C |
| 2016/0054165 A1* | 2/2016 | Huang | G01F 23/26 73/290 R |

FOREIGN PATENT DOCUMENTS

| | | |
|---|---|---|
| CN | 104136893 A | 11/2014 |
| JP | 43-001327 | 1/1968 |
| JP | 55-017904 | 2/1980 |
| JP | 55-128123 | 10/1980 |
| JP | 63-065320 | 3/1988 |
| JP | 63-073116 | 4/1988 |
| JP | 63-289423 | 11/1988 |
| JP | 2-276918 | 11/1990 |
| JP | 4-301521 | 10/1992 |
| JP | 4-018523 | 10/1993 |
| JP | 6-174531 | 6/1994 |
| JP | 7-0507140 | 8/1995 |
| JP | 11-281459 | 10/1999 |
| JP | 2012-225788 | 11/2012 |
| JP | 05-079440 | 4/2018 |
| JP | 56-121126 | 4/2018 |
| TW | I440829 | 6/2014 |
| TW | I457545 B | 10/2014 |

OTHER PUBLICATIONS

T. Nakagawa et al., "Contactless Liquid-Level Measurement With Frequency-Modulated Millimeter Wave Through Opaque Container," Sensors Journal, Jan. 2013, pp. 926-933, vol. 13, Issue 3, IEEE, US.

C.S.S. Babu et al., "Design of a Low Cost Signal Conditioning Circuit for Self-Compensated Non Contact Capacitive Type Multi Threshold Liquid-Level Sensor," Proceedings of International on Circuits, Communication, Control and Computing, Nov. 2014, pp. 58-63, IEEE, US.

Alan K. Rego Segundo et al., "Development of Capacitive Sensor for Measuring Soil Water Content," Engenharia Agricola, Apr. 2011, 9 pages, vol. 31, No. 2, SBEA, Brazil.

Guilin Zheng et al., "Fast Dynamic Liquid Level Based on Liquid Resistance," Africon 2007, Sep. 2007, 7 pages, IEEE, US.

V. Bande et al., "Low-Cost Capacitive Sensor for Wells Level Measurement," Electronics Technology, May 2010, pp. 279-283, IEEE, US.

D. P. Seliskar et al. "Proportional Microvolume Capacitive Liquid Level Sensor Array," Engineering in Medicine and Biology Society, Sep. 2005, pp. 7258-7261, IEEE, US.

Japan Patent Office, Office Action, Patent Application Serial No. 2015-257290, dated Aug. 2, 2016, Japan.

* cited by examiner

APPARATUS FOR DETECTING LIQUID LEVEL

CROSS REFERENCE TO RELATED APPLICATIONS

This Application claims priority of Taiwan Patent Application No. 104140070, filed on Dec. 1, 2015, and No. 104143518, filed on Dec. 24, 2015, the entirety of which is incorporated by reference herein.

BACKGROUND OF THE INVENTION

Technical Field

The present invention relates to a detecting device, and in particular it relates to an apparatus for detecting the liquid level.

Background

Liquid level sensors and level sensors are widely used in various fields. For example, a level sensor can be applied in a rain gauge, to monitor rainfall. In addition, a liquid level sensor can also be used in the medical field. For example, a liquid level sensor can be used in a container containing an intravenous injection solution to monitor the flow or speed of the intravenous injection, and it provides information to health care providers.

One traditional liquid level sensor determines the liquid level using image identification technology, as shown in U.S. Pat. No. 7,982,201. Another traditional liquid level sensor uses ultrasound detecting technology to determine the liquid level, as described in U.S. Pat. No. 4,610,164. However, theses traditional liquid level sensors are expensive and complicated, and are no user-friendly nor easy to use. Furthermore, another traditional liquid level detecting mechanism is implemented by using an electrode to come in direct contact with the liquid level, but the invasive detection mechanism cannot maintain sterility and therefore it cannot be used in medical equipment.

SUMMARY

The application provides a novel liquid level sensor using at least one electrode to detect the liquid level of a liquid to be tested, and acquires the liquid-level information according to a sensing capacitance corresponding to the liquid level and a lookup table.

An embodiment of the invention provides a liquid level sensing device to detect liquid-level information of a liquid to be tested in a container. The liquid level sensing device comprises an electrode, a sensing circuit, an amplifier and a controller. The electrode is disposed on an outer surface of the container. The sensing circuit is coupled to the electrode to detect variations in the volume of the liquid to be tested. The sensing circuit further receives a clock signal to generate a first voltage signal and a second voltage signal. The amplifier receives the first voltage signal and the second voltage signal to generate an output voltage. The controller acquires the liquid-level information according to the output voltage and a voltage-volume table.

Another embodiment of the invention provides a liquid level sensing device to detect liquid-level information of a liquid to be tested in a container. The liquid level sensing device comprises a first electrode, a second electrode, a sensor, an amplifier and a controller. The first electrode and the second electrode are disposed on an outer surface of the container via an adhesive layer to detect variations in the volume of the liquid to be tested. The sensor is coupled to the first electrode and the second electrode to receive a clock signal to generate a first voltage signal and a second voltage signal. The amplifier receives the first voltage signal and the second voltage signal to generate an output voltage. The controller acquires the liquid-level information according to the output voltage and a voltage-volume table.

Another embodiment of the invention provides a liquid level sensing device to detect liquid-level information of a liquid to be tested in a container. The liquid level sensing device comprises a first electrode, a sensing circuit, an amplifier and a controller. The first electrode is disposed on an outer surface of the container to detect variations in the volume of the liquid to be tested. The sensing circuit is coupled to the first electrode to receive a clock signal generated by a clock source to generate a first voltage signal and a second voltage signal. The amplifier receives the first voltage signal and the second voltage signal to generate an output voltage. The controller acquires the liquid-level information according to the output voltage and a voltage-volume table.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DESCRIPTION OF THE EMBODIMENTS

The following description is of the best-contemplated mode of carrying out the invention. This description is made for the purpose of illustrating the general principles of the invention and should not be taken in a limiting sense. The scope of the invention is best determined by reference to the appended claims.

Figure 1:
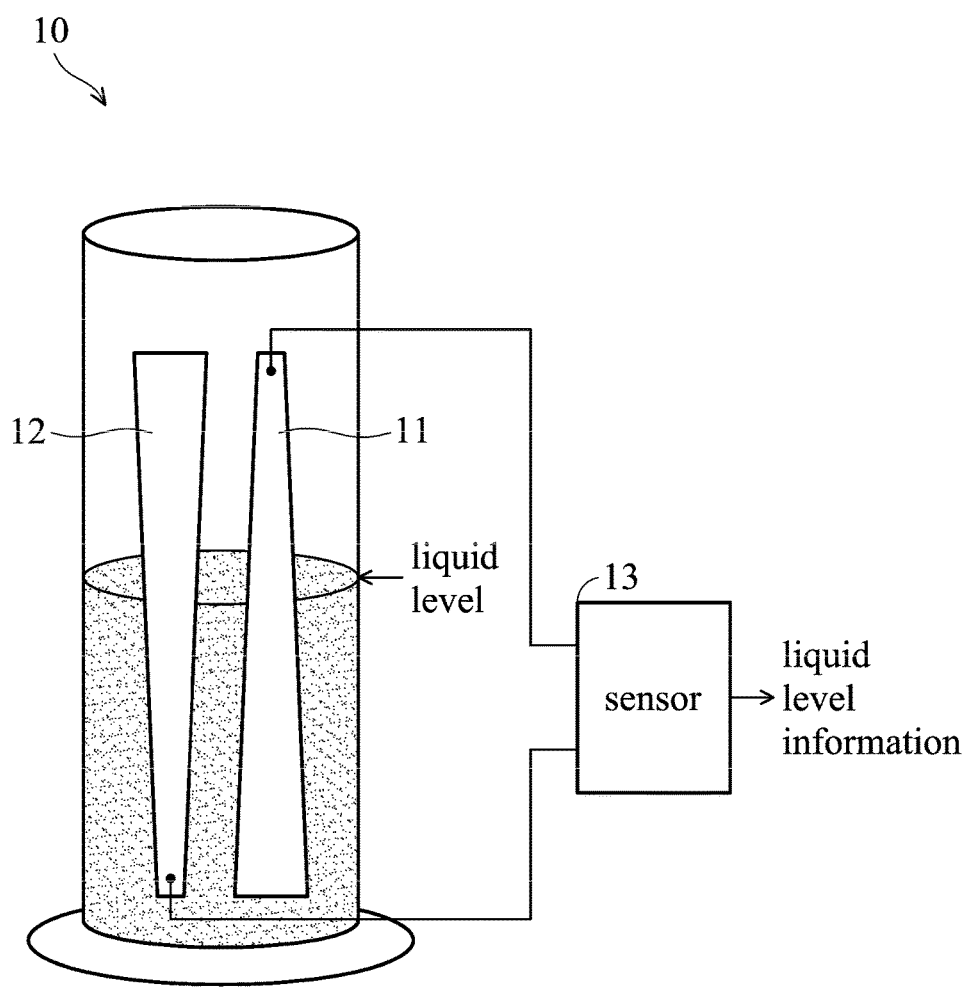
FIG. 1 is a schematic diagram of a liquid level sensing device according to an embodiment of the invention.

FIG. 1 is a schematic diagram of a liquid level sensing device according to an embodiment of the invention. The liquid level sensing device comprises a first electrode 11, a second electrode 12 and a sensor 13. The container 10 is filled with a liquid to be tested, and the first electrode 11 and the second electrode 12 are disposed on the outer surface of the container. The capacitance variation of the first electrode 11 and the second electrode 12 is a gradient variation. In this embodiment, the first electrode 11 and the second electrode 12 are trapezoid electrodes.

The first terminal of the first electrode 11 and the second terminal of the second electrode 12 are coupled to the sensor 13. The sensor 13 applies a clock signal to the first electrode 11 or the second electrode 12 to sense the capacitance of an equivalent capacitor formed by the first electrode 11, the second electrode 12, and the liquid within the container 10.

The circuit of the sensor 13 further comprises a reference capacitor, and a sensing voltage is generated according to the capacitance of the reference capacitor and the capacitance of the equivalent capacitor. The sensor 13 detects the current volume of the liquid to be tested within the container 10 according to the sensing voltage and a voltage-volume table. In this embodiment, a maximum capacitance of the equivalent capacitor is detected by the sensor 13 when the liquid to be tested completely fills the container 10, wherein the equivalent capacitor formed by the first electrode 11, the second electrode 12, and the liquid within the container 10.

Figure 2:
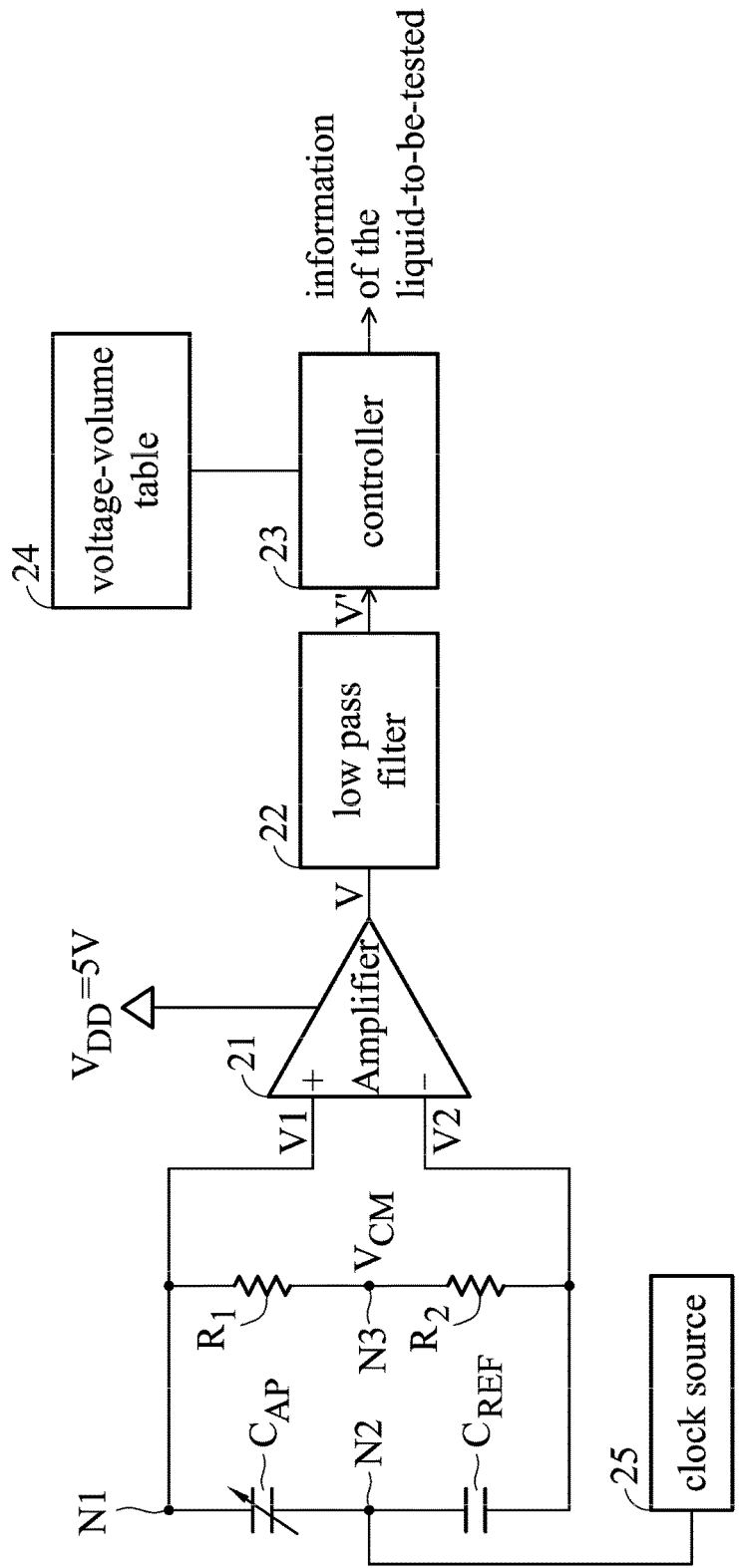
FIG. 2 is a schematic diagram of a liquid level sensor according to an embodiment of the invention.

FIG. 2 is a schematic diagram of a liquid level sensor according to an embodiment of the invention. The sensor is connected to a container to detect the volume of a liquid to be tested within the container. A first electrode and a second electrode are disposed on the container to provide a sensing signal to the sensor.

The sensor 13 comprises an amplifier 21, a low pass filter 22, a controller 23, a voltage-volume table 24 and a clock source 25. The sensor 13 comprises a node N1 coupled to the first electrode, such as the first electrode 11 in FIG. 1, and a first terminal of a variable capacitor $C_{AP}$. The variable capacitor $C_{AP}$ is an equivalent capacitor, such as the equivalent capacitor formed by the first electrode 11, the second electrode 12, and the liquid within the container 10 in FIG. 1. The sensor 13 comprises a node N2 coupled to the second electrode, such as the second electrode 12 in FIG. 1, and a first terminal of a reference capacitor $C_{REF}$. The node N2 is further coupled to a second terminal of the variable capacitor $C_{AP}$ and the clock source 25 to receive a clock signal, and the capacitance of the variable capacitor $C_{AP}$ varies according to the volume of the liquid to be tested within the container.

The sensor 13 further comprises a resistor $R_1$ and a resistor $R_2$. The resistor $R_1$ has a first terminal coupled to the node N1 and a first input terminal of the amplifier 21, and a second terminal coupled to the node N3. The resistor $R_2$ has a first terminal coupled to the node N3, and a second terminal coupled to a second input terminal of the amplifier 21 and a second terminal of the reference capacitor $C_{REF}$. In this embodiment, the node N3 receives a common mode voltage $V_{CM}$. In this embodiment, the operation voltage of the amplifier is 5V and the common mode voltage is 2.5V.

The described variable capacitor $C_{AP}$, the reference capacitor $C_{REF}$, the resistor $R_1$ and the resistor $R_2$ can be regarded as a sensing circuit. The sensing circuit receives the clock signal output from the clock source 25 to generate a first voltage V1 and a second voltage V2, and transmits the first voltage V1 and the second voltage V2 to the amplifier 21. The amplifier 21 outputs an output voltage V according to the first voltage V1 and the second voltage V2. The output voltage V is transmitted to the controller 23 via the low pass filter 22. The low pass filter 22 filters out a high frequency noise from the output voltage V. The controller 23 looks up the voltage-volume table 24 according to the received voltage to acquire the information of the liquid to be tested, such as the remaining volume or a reduced volume of the liquid to be tested within the container. In one embodiment, the voltage-volume table 24 is stored in a storage device.

Figure 3:
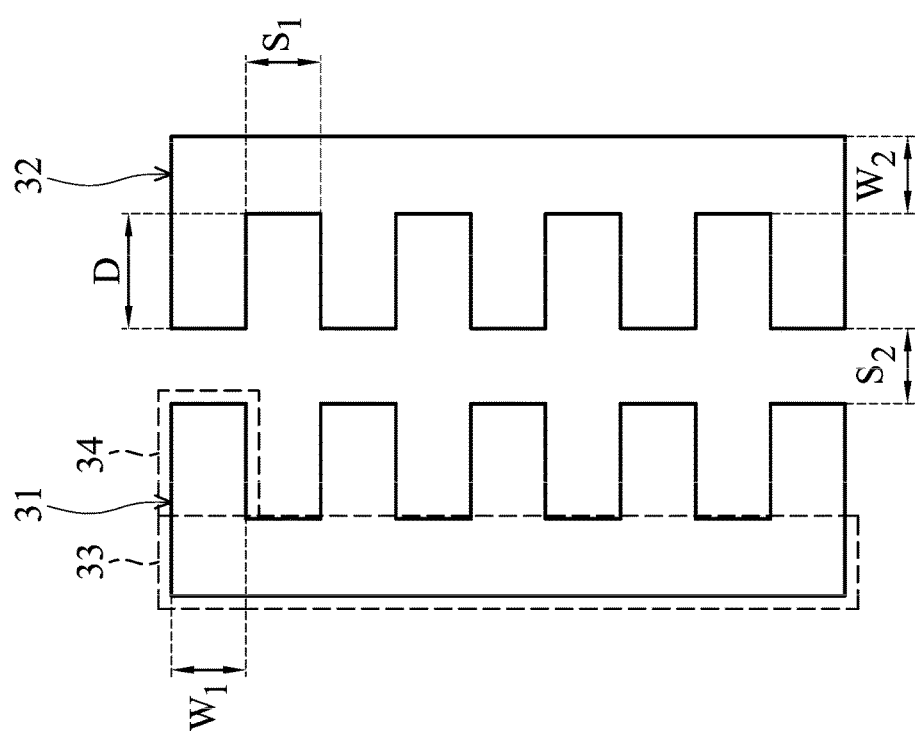
FIG. 3 is a schematic diagram of an electrode according to an embodiment of the invention.

FIG. 3 is a schematic diagram of an electrode according to an embodiment of the invention. In this embodiment, the size, shape, and dimensions of the first sensing electrode 31 and the second sensing electrode 32 are identical. The first sensing electrode 31 comprises a body 33 and a plurality of extension parts 34 to form a comb electrode. Similarly, the second sensing electrode has the same structure as the first sensing electrode 31. In one embodiment, an adhesive layer is formed on one side of each first sensing electrode 31 and second sensing electrode 32, and the first sensing electrode 31 and second sensing electrode 32 are disposed on the container via the adhesive layer to detect variations in the volume of the liquid to be tested. In another embodiment, the first sensing electrode 31 and the second sensing electrode 32 are formed on the outer surface of the container by a metal printing technology. Furthermore, each of the first sensing electrode 31 and second sensing electrode 32 comprises contact nodes for connecting the sensor.

Since the capacitance of an equivalent capacitor sensed by the first sensing electrode 31 and the second sensing electrode 32 is proportional to the area of the electrode, in this embodiment, the dimensions of the first sensing electrode 31 and the second sensing electrode 32 have to meet the following requirements:

$$(W_1+S_1) \times A = \Delta V,$$

$$D > W_2, \text{ and}$$

$$(D+W_2)/4 < S_2 < (D+W_2)/2,$$

wherein $W_1$ is the width of each the extension part 34, D is the length of each extension part 34, $W_2$ is the width of the body 33, $S_1$ is the distance between every two adjacent extension parts 34, $S_2$ is the distance between the extension parts of the first electrode 31 and the extension parts of the second electrode 32, A is the cross-sectional area of the container, and $\Delta V$ is the variation volume of the liquid to be tested.

Please refer to Table 1. Table 1 shows test results of the dual comb electrodes shown in FIG. 3 and the sensor shown in FIG. 2. In this embodiment, a cross-sectional area A of the container, the width $W_1$ of the extension part 34, and the distance $S_1$ between every two adjacent extension parts 34 meet the following requirements:

$$(W_1+S_1) \times A = 10 \text{ (ml)}.$$

In this embodiment, the variation volume of the liquid to be tested $\Delta V$ is designed to be 10 ml, but the disclosure is not limited thereto.

The configuration of the sensor:

The voltage gain of the amplifier is 400, and the frequency of the clock signal is 250 KHz.

TABLE 1

| Volume of the liquid to be tested | Output Voltage | Output Voltage Variation |
| --- | --- | --- |
| 0 ml | 3715 mV | |
| 10 ml | 3765 mV | 50 mV |
| 20 ml | 3818 mV | 53 mV |
| 30 ml | 3868 mV | 50 mV |
| 40 ml | 3921 mV | 53 mV |
| 50 ml | 3952 mV | 31 mV |

From the table 1, it can be seen that the output voltage, such as the voltage V' filtered by the low pass filter 22 in FIG. 2, varies according to the different levels of volume of the liquid to be tested, and the voltage variation is substantially 50 mV when the volume of the liquid to be tested is increased by 10 ml. Therefore, the sensing device disclosed in the application can not only detect the volume of the liquid to be tested, but also variations in the volume of the liquid to be tested. The experimental result shown in table 1 is obtained by $W_1<S_1$, but disclosure is not limited thereto.

Figure 4:
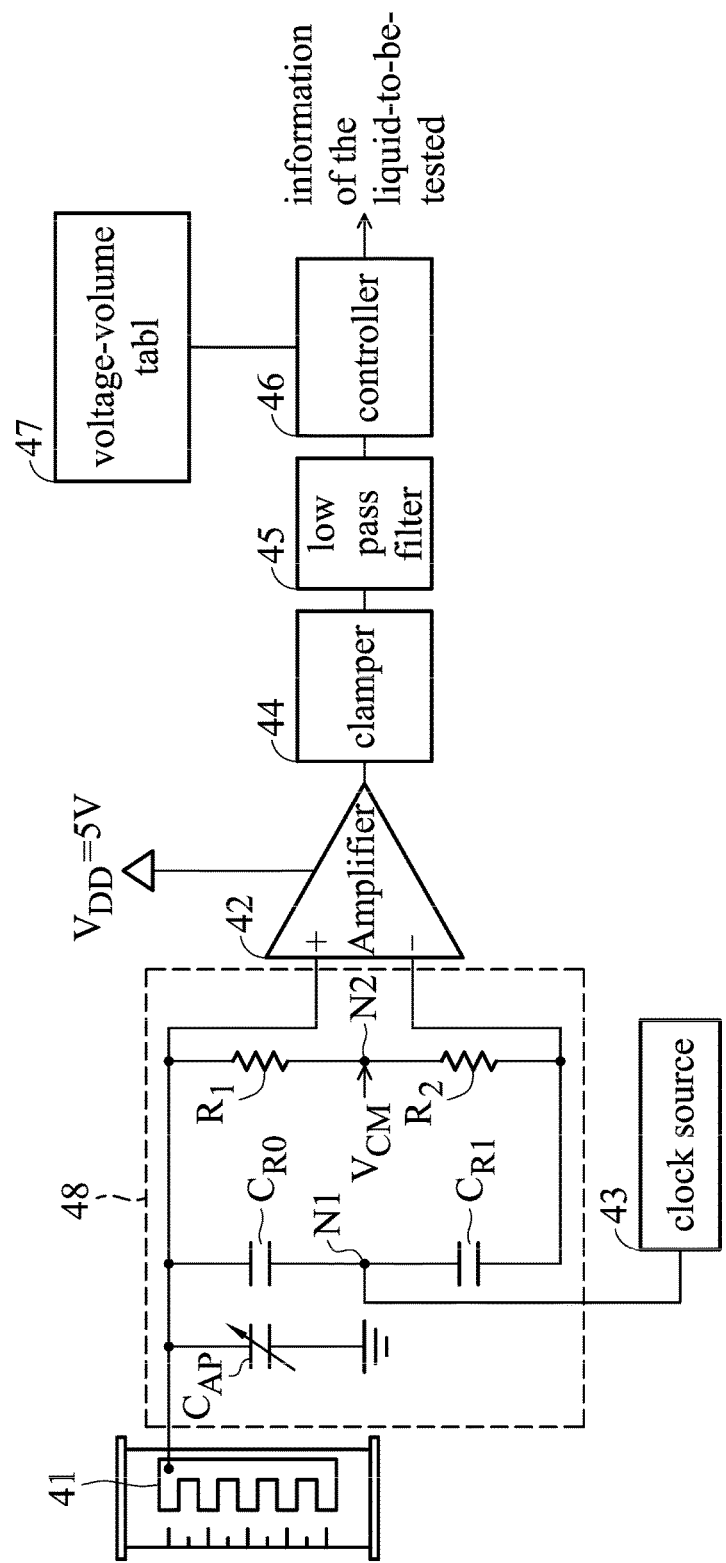
FIG. 4 is a schematic diagram of a liquid level sensing device according to another embodiment of the invention.

The described embodiment is illustrated with dual electrodes. However, a single electrode is applicable to the proposed sensing device. Please refer to FIG. 4. FIG. 4 is a schematic diagram of a liquid level sensing device according to another embodiment of the invention. The liquid level sensing device comprises a sensing electrode 41, an amplifier 42, a clock source 43, a clamper 44, a low pass filter 45, a controller 46, a voltage-volume table 47 and a sensing circuit 48.

The sensing electrode 41 is disposed on an outer surface of a container filled with a liquid to be tested via an adhesive layer. The sensing circuit 48 is coupled to the sensing electrode 41, senses information of the liquid to be tested according to a clock signal input by the clock source 43, and outputs a first voltage and a second voltage to a positive input terminal and a negative input terminal of the amplifier. The amplifier 42 outputs a first output voltage signal to the clamper 44 according to the first voltage and the second voltage. In this embodiment, the asymmetry sensing circuit 48 causes the first output voltage signal to contain positive voltage parts and negative voltage parts according to the clock signal. Therefore, the clamper 44 transforms the negative voltage parts of the first output voltage signal into positive voltages and outputs a second output voltage signal to the low pass filter 45. The filtered second output voltage signal is a DC voltage. The low pass filter 45 outputs a voltage value to the controller 46, and the controller 46 looks up the voltage-volume table 47 according to the received voltage value to acquire information about the liquid to be tested, such as the remaining volume or the reduced volume of the liquid to be tested within the container.

The sensing circuit 48 comprises a variable capacitor $C_{AP}$, a first capacitor $C_{R0}$, a second capacitor $C_{R1}$, a resistor $R_1$ and a resistor $R_2$. The variable $C_{AP}$ capacitor has a first terminal coupled to the sensing electrode 41, and a second terminal is grounded. The first capacitor $C_{R0}$ has a first terminal coupled to the sensing electrode 41 and the positive input terminal of the amplifier 42, and a second terminal coupled to node N1. The node N1 receives the clock signal from the clock source 43. The second capacitor $C_{R1}$ has a first terminal coupled to the node N1, and a second terminal coupled to the negative input terminal of the amplifier 42. The resistor $R_1$ has a first terminal coupled to the sensing electrode 41 and the positive input terminal of the amplifier 42, and a second terminal coupled to the node N2. The resistor $R_2$ has a first terminal coupled to the node N2, and a second terminal coupled to the negative input terminal of the amplifier 42. The node N2 receives a common mode voltage $V_{CM}$. In this embodiment, the operation voltage of the amplifier is 5V and the common mode voltage is 2.5V.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid level sensing device to detect liquid-level information of a liquid to be tested in a container, comprising:
   a first electrode and a second electrode disposed on an outer surface of the container to detect a variation volume of the liquid to be tested;
   a sensor coupled to the first electrode and the second electrode to receive a clock signal generated by a clock source to generate a first voltage signal and a second voltage signal;
   an amplifier to receive the first voltage signal and the second voltage signal to generate an output voltage; and
   a controller to acquire the liquid-level information according to the output voltage and a voltage-volume table, wherein the first electrode and the second electrode are comb electrodes, and both the first electrode and the second electrode comprise a body and a plurality of extension parts, wherein $W_1$ is a width of each extension part, D is a length of each extension part, $W_2$ is a width of the body, $S_1$ is a distance between two adjacent extension parts, $S_2$ is a distance between the extension parts of the first electrode and the extension parts of the second electrode, A is a cross-sectional area of the container, $\Delta V$ is the variation volume of the liquid to be tested, and $W_1$, $W_2$, A, $S_1$, $S_2$, $\Delta V$ and D meet the requirements below:

$$(W_1+S_1) \times A = \Delta V,$$

$$D > W_2, \text{ and}$$

$$(D+W_2)/4 < S_2 < (D+W_2)/2.$$

2. The liquid level sensing device as claimed in claim 1, further comprising a low pass filter to receive the output voltage, filter out high frequency noise of the received output voltage and transmit filtered output voltage to the controller.

3. The liquid level sensing device as claimed in claim 1, wherein the voltage-volume table stores a remaining volume or a reduced volume of the liquid to be tested in a storage device.

4. The liquid level sensing device as claimed in claim 1, wherein the sensor comprises:
   a first resistor having a first terminal coupled to a first node and a first input terminal of the amplifier, and a second terminal coupled to a third node;
   a second resistor having a first terminal coupled to the third node, and a second terminal coupled to a second input terminal of the amplifier;
   a variable capacitor having a first terminal coupled to the first node and the first electrode, and a second terminal coupled to a second node and the second electrode, wherein variable capacitor is an equivalent capacitor formed by the first electrode, and the second electrode, and the liquid stored in the container; and
   a reference capacitor having a first terminal coupled to the second node, and a second terminal coupled to the second input terminal of the amplifier;
   wherein the clock is fed to the second node and the third node receives a common mode voltage.

5. The liquid level sensing device as claimed in claim 1, wherein the first electrode and the second electrode are formed on the outer surface of the container by a metal printing technology.

6. The liquid level sensing device as claimed in claim 1, wherein the first electrode and the second electrode each has an adhesive layer formed on one side thereof, and the first electrode and the second electrode are stuck on the outer surface of the container by the adhesive layer.

7. A liquid level sensing device to detect liquid-level information of a liquid to be tested in a container, comprising:
   a first electrode disposed on an outer surface of the container to detect a variation volume of the liquid to be tested;
   a sensing circuit coupled to the first electrode to receive a clock signal generated by a clock source to generate a first voltage signal and a second voltage signal;

an amplifier to receive the first voltage signal and the second voltage signal to generate an output voltage; and a controller to acquire the liquid-level information according to the output voltage and a voltage-volume table, wherein the first electrode is a comb electrode, and the first electrode comprises a body and a plurality of extension parts, wherein $W_1$ is a width of each extension part, D is a length of each extension part, $W_2$ is a width of the body, $S_1$ is a distance between every two adjacent extension parts, A is a cross-sectional area of the container, $\Delta V$ is the variation volume of the liquid to be tested, and $W_1$, $W_2$, A, D, $S_1$ and $\Delta V$ meet the requirements below:

$(W_1+S_1) \times A = \Delta V$, and $D > W_2$.

8. The liquid level sensing device as claimed in claim 7, further comprising a low pass filter to receive the output voltage, filter out high frequency noise of the received output voltage and transmit filtered output voltage to the controller.

9. The liquid level sensing device as claimed in claim 7, wherein the output voltage is varied according to the clock signal to form an output voltage signal, and the liquid level sensing device further comprises a clamper to transform negative voltage parts of the output voltage signal into positive voltages and outputs a second output voltage.

10. The liquid level sensing device as claimed in claim 7, wherein the voltage-volume table stores the remaining volume or the reduced volume of the liquid to be tested in a storage device.

11. The liquid level sensing device as claimed in claim 7, wherein the sensor comprises:

a first resistor having a first terminal coupled to a first node and a first input terminal of the amplifier, and a second terminal coupled to a second node;

a second resistor having a first terminal coupled to the second node, and a second terminal coupled to a second input terminal of the amplifier;

a variable capacitor having a first terminal coupled to the first node and the first electrode, and a second terminal grounded, wherein variable capacitor is an equivalent capacitor formed by the first electrode, ground and the liquid stored in the container;

a first reference capacitor having a first terminal coupled to the first node, and a second terminal coupled to a third node; and a second reference capacitor having a first terminal coupled to the third node, and a second terminal coupled to the second input terminal of the amplifier;

wherein the clock signal is fed to the third node and the second node receives a common mode voltage.

12. The liquid level sensing device as claimed in claim 7, wherein the first electrode is formed on the outer surface of the container by a metal printing technology.

13. The liquid level sensing device as claimed in claim 7, wherein the first electrode has an adhesive layer formed on one side thereof, and the first electrode is stuck on the outer surface of the container by the adhesive layer.

* * * * *